(12) United States Patent
Ragg

(10) Patent No.: US 12,130,050 B2
(45) Date of Patent: Oct. 29, 2024

(54) HEATING APPARATUS

(71) Applicant: Munster Simms Engineering Limited, Bangor (GB)

(72) Inventor: Christopher William Ragg, Belfast (GB)

(73) Assignee: Munster Simms Engineering Limited, Bangor (GB)

( * ) Notice: Subject to any disclaimer, the term of this patent is extended or adjusted under 35 U.S.C. 154(b) by 130 days.

(21) Appl. No.: 16/529,045

(22) Filed: Aug. 1, 2019

(65) Prior Publication Data

US 2019/0353395 A1 Nov. 21, 2019

Related U.S. Application Data

(63) Continuation of application No. 15/503,191, filed as application No. PCT/EP2015/068716 on Aug. 13, 2015, now Pat. No. 10,480,819.

(30) Foreign Application Priority Data

Aug. 14, 2014 (GB) ...................................... 1414454
Aug. 14, 2014 (GB) ...................................... 1414462

(51) Int. Cl.
 *F24H 1/20* (2022.01)
 *B60H 1/00* (2006.01)
 (Continued)

(52) U.S. Cl.
 CPC ........... *F24H 1/20* (2013.01); *B60H 1/00364* (2013.01); *B60H 1/2203* (2013.01); *B60H 1/2209* (2013.01); *F24H 1/009* (2013.01); *F24H 1/207* (2013.01); *F24H 9/0031* (2013.01); *F28D 7/06* (2013.01); *F28D 7/12* (2013.01); *F28D 20/0034* (2013.01); *F28D 21/0003* (2013.01);
 (Continued)

(58) Field of Classification Search
 CPC ........... F23D 14/08; F23D 14/10; F23D 14/36
 USPC .......................... 122/18.1; 126/110 B, 110 C
 See application file for complete search history.

(56) References Cited

U.S. PATENT DOCUMENTS 3,028,843 A     4/1962  Carlson et al.
4,224,019 A *   9/1980  Dilmore ................ F23D 14/725
                                                           431/328

(Continued)

FOREIGN PATENT DOCUMENTS

CA            1209868  A1     8/1986

OTHER PUBLICATIONS

Examination Report dated Jun. 21, 2019, for corresponding European Application No. 15749830.4, filed on Sep. 26, 2018; consisting of 5-pages.

(Continued)

*Primary Examiner* — Steven B McAllister
*Assistant Examiner* — John E Bargero
(74) *Attorney, Agent, or Firm* — Leech Tishman Fuscaldo & Lampl

(57) ABSTRACT

A heating apparatus comprising a tank having a tank inlet, a tank outlet, a heat exchanger inlet and heat exchanger outlet. A heat exchanger is located in the tank and comprises a hollow body having a mouth coupled to the heat exchanger inlet and a flue outlet coupled to the heat exchanger outlet. A burner device has a burner head that is located at least partly located in the mouth inside said hollow body.

13 Claims, 9 Drawing Sheets

(51) Int. Cl.
    *B60H 1/22*     (2006.01)
    *F24H 1/00*     (2022.01)
    *F24H 9/00*     (2022.01)
    *F28D 7/06*     (2006.01)
    *F28D 7/12*     (2006.01)
    *F28D 20/00*     (2006.01)
    *F28D 21/00*     (2006.01)
    *F28F 13/06*     (2006.01)

(52) U.S. Cl.
    CPC ...... *F28F 13/06* (2013.01); *B60H 2001/2271* (2013.01); *F28D 21/00* (2013.01); *F28F 2250/04* (2013.01); *Y02E 60/14* (2013.01)

(56) References Cited

U.S. PATENT DOCUMENTS

| | | | | |
|---|---|---|---|---|
| 4,424,793 | A * | 1/1984 | Cooperrider | F23D 14/36 |
| | | | | 126/110 B |
| 4,771,762 | A | 9/1988 | Bridegum | |
| 5,085,579 | A | 2/1992 | Moore, Jr. et al. | |
| 5,437,249 | A * | 8/1995 | Adams | F24H 1/206 |
| | | | | 122/18.3 |
| 5,931,657 | A * | 8/1999 | Klouda | F23D 14/085 |
| | | | | 431/185 |
| 6,152,083 | A | 11/2000 | Bridegum | |
| 9,772,119 | B2 * | 9/2017 | Shellenberger | F24H 3/087 |
| 2002/0069868 | A1 * | 6/2002 | Hughes | 126/100 |
| 2005/0178344 | A1 * | 8/2005 | Garrett | F23D 14/36 |
| | | | | 126/91 A |
| 2008/0066694 | A1 | 3/2008 | Smith et al. | |
| 2008/0264356 | A1 | 10/2008 | Oda | |
| 2012/0145373 | A1 | 6/2012 | Chadwick | |
| 2013/0112155 | A1 * | 5/2013 | Abdel-Rehim | F24H 1/206 |
| | | | | 122/15.1 |

OTHER PUBLICATIONS

International Search Report and Written Opinion dated Oct. 12, 2015 for corresponding International Application No. PCT/EP2015/068716 International Filing Date: Aug. 13, 2015 consisting of 10-pages.

\* cited by examiner

HEATING APPARATUS

CROSS-REFERENCE TO RELATED APPLICATION

This application is a continuation of U.S. National Stage patent application Ser. No. 15/503,191, filed Feb. 10, 2017 entitled "HEATING APPARATUS," which claims priority to, International Application Number PCT/EP2015/068716 entitled HEATING APPARATUS, filed Aug. 13, 2015, which is related to and claims priority from Great Britain Patent Application Number 1414454.7, filed Aug. 14, 2014 and Great Britain Patent Application Number 1414462.0 filed Aug. 14, 2014, the entirety of all of which are incorporated herein by reference.

FIELD

The present invention relates to heating apparatus, especially for use with vehicles or mobile, portable or temporary structures.

BACKGROUND

Vehicles such as recreational vehicles (RVs) or caravans, and mobile or portable structures such as mobile homes or portable buildings, usually include a water supply system that includes a water heating apparatus and/or one or more space (air) heaters. In such applications, space is often at a premium. It would be desirable therefore to provide a heating apparatus that is relatively small and which exhibits improved efficiency.

SUMMARY

One aspect of the invention provides a heating apparatus comprising: a tank having a tank inlet, a tank outlet, a heat exchanger inlet and heat exchanger outlet; a heat exchanger located in said tank and comprising a hollow body having a mouth coupled to said heat exchanger inlet and a flue outlet coupled to said heat exchanger outlet; and a burner device having a burner head, wherein said burner head is at least partly located in said mouth inside said hollow body.

The heat exchanger inlet and heat exchanger outlet are preferably located in a common face of the water tank, preferably at an end of the tank. The heat exchanger inlet and heat exchanger outlet may be provided in the same face that includes the tank outlet and tank inlet.

Preferably, said hollow body is not in contact with the internal surfaces of the water tank. Preferably, the body is configured to define at least one substantially U-shaped internal fluid path between the mouth and the flue outlet.

In preferred embodiments, the heating apparatus includes a baffle or other structure(s) in the body to partition the internal body space between the mouth and flue outlet to define a fluid path that runs from the mouth away from the mouth end of the body towards the opposite end of the body, around a free end of the baffle, or other structure(s) and back to the flue outlet. The baffle typically comprises a plate that extends longitudinally of the body having one end located at the mouth end of the body separating the mouth and flue outlet, and the other end located adjacent but spaced from the other body end.

In preferred embodiments, a plurality of pipes extend transversely through the body across the fluid path between the mouth and the flue outlet, the pipes being open to the interior of the tank so that in use they are filled by the contents of the tank. Preferably the pipes are spaced-apart in a longitudinal direction of the body, a first one of the pipes preferably being located adjacent the mouth and a last one preferably being located adjacent the opposite end of the body. The pipes may be spaced-apart in a direction perpendicular with the longitudinal and transverse axes of the body. Preferably the pipes are arranged such that, from the first pipe to the last pipe, the vertical spacing from one pipe to the next is in the same vertical sense, and is preferably substantially uniform.

It is preferred that the pipes are provided on the mouth side of the baffle when present. It is particularly preferred that the first pipe is located relatively close to the baffle, the next pipes being progressively further from the baffle until the last pipe is furthest from the baffle.

In preferred embodiments, the pipes define on one side an internal body region that is relatively wide adjacent the mouth and which tapers in a direction towards the opposite end of the body, and an internal body region on the other side that is relatively narrow adjacent the mouth and which widens in a direction towards the opposite end of the body.

The heat exchanger body preferably comprises first and second parts which are formed separately and joined together, the first and second parts being shaped to define together the desired body shape.

Said burner device preferably includes a body for supplying a mixture of combustible gas and air to said burner head, said burner body being located outside of said water tank.

Insulating material is typically provided around at least the sides and preferably one or both ends of the tank, but not at the top of the tank and optionally not at the bottom of the tank, said tank usually being located inside a housing. The housing typically has a top portion that is contiguous with the top of the tank and optionally to have a bottom portion that is contiguous with the bottom of the tank. Preferably the housing has one or more mounting devices for mounting a top portion of said housing to a surface.

Preferably, said housing is shaped and dimensioned to provide space between at least the sides of the tank, and preferably one or both ends of the tank, for receiving insulating material.

The preferred housing is shaped and dimensioned to define a head space a face, preferably an end face, of said tank, said head space being shaped and dimensioned to receive at least a body section of said burner device.

Another aspect of the invention provides a heat exchanger comprising a hollow body having a fluid inlet and a flue outlet wherein a plurality of pipes extend transversely through the body across a fluid path between the mouth and the flue outlet, the pipes being open to the external environment of the hollow body.

The pipes may be spaced-apart in a longitudinal direction of the body, a first one of the pipes preferably being located adjacent the inlet and a last one preferably being located adjacent the opposite end of the body. The pipes are preferably spaced-apart in a direction perpendicular with the longitudinal and transverse axes of the body. The pipes may be arranged such that, from the first pipe to the last pipe, the vertical spacing from one pipe to the next is in the same vertical sense, and is preferably substantially uniform.

The heat exchanger preferably includes a baffle or other structure(s) in the body to partition the internal body space between the fluid inlet and flue outlet to cause said fluid path to run from the fluid inlet towards the opposite end of the body, around a free end of the baffle, or other structure(s) and back to the flue outlet. The baffle typically comprises a plate that extends longitudinally of the body having one end located at the inlet end of the body, separating the mouth and flue outlet, and the other end located adjacent but spaced from the other body end. The pipes are typically provided on the inlet side of the baffle. The first pipe is preferably located relatively close to the baffle, the next pipes being progressively further from the baffle until the last pipe is furthest from the baffle.

In preferred embodiments, the pipes define on one side an internal body region that is relatively wide adjacent the fluid inlet and which tapers in a direction towards the opposite end of the body, and an internal body region on the other side that is relatively narrow adjacent the mouth and which widens in a direction towards the opposite end of the body.

Typically, the body comprises first and second parts which are formed separately and joined together, the first and second parts being shaped to define together the desired body shape. Said first and second body parts may include respective apertures for receiving said pipes.

A further aspect of the invention provides a burner device comprising: an air intake; a burner head including an ignition device; a body section defining a fluid flow channel between said air intake and said burner head; and a gas injector for injecting combustible gas into said fluid flow channel, wherein the burner head is oriented such that its longitudinal axis is substantially perpendicular to the plane in which said channel is defined and in which fluid flows, in use, along said channel.

The burner device typically includes a fan housing which houses a fan and includes said air intake and an air outlet in fluid communication with said fluid flow channel, the configuration being such that, in use, the fan draws air into the burner device through said air intake and supplies the drawn air to the fluid flow channel via said air outlet. Said fan housing and said body section are typically substantially coplanar. Usually the rotational axis of the fan is substantially perpendicular with the plane in which the fluid flow channel is defined and in which fluid flows along the channel in use.

In preferred embodiments, the burner head comprises a body shaped to define a mixing chamber, the mixing chamber having an inlet by which a mixture of combustible gas and air is received in use from the fluid flow channel, and an outlet by which said mixture of combustible gas and air is directed to the ignition device. The mixing chamber inlet may comprise a plurality of spaced apart apertures formed in a wall between the fluid flow channel and the mixing chamber. Preferably, the mixing chamber outlet is oppositely located with respect to the mixing chamber inlet. A mesh structure comprising one or more layers of mesh material may be provided between said inlet and said outlet.

Typically, the transverse cross sectional area of the mixing chamber is relatively large in comparison with the transverse cross sectional area of the fluid flow channel.

An air flow detector is preferably provided in the fluid flow channel for detecting whether or not air is flowing in the channel. The preferred body section is shaped to define an air flow detection channel having an inlet located in the fluid flow channel, and an outlet located downstream of the inlet, and wherein said air flow detector is located in the air flow detection channel. Said air flow detection channel inlet is preferably located between the fan air outlet and the location at which the gas injector injects combustible gas, in use, into said fluid flow channel. Said air flow detection channel outlet is typically located downstream of the location at which the gas injector injects combustible gas, in use, into said fluid flow channel, preferably at the end of the fluid flow channel adjacent the inlet to the mixing chamber.

The preferred burner device includes or is cooperable with a controller, the controller being responsive to a signal generated by the air flow detector to stop the injection of combustible gas into the fluid flow channel by the gas injector depending on the level of detected air flow. The controller is advantageously configured to stop the gas injection upon detection of no air flow by the detector, or the detection of a level of air flow below a threshold level. The controller is preferably configured to activate the ignition device after the gas injector has been operated to inject gas into the fluid flow channel. Said fluid flow channel is advantageously curved in the direction of fluid flow.

The preferred burner includes at least one resonance chamber shaped and dimensioned such that fluid inside it resonates, in use, at a respective selected resonant frequency. The or each resonance chamber has a fluid inlet to allow fluid communication between the respective chamber the fluid in the burner. The inlets advantageously open into the mixing chamber.

In preferred embodiments, said body section is separably formed from said burner head. Said body section preferably comprises first and second parts joined together to form said fluid flow channel. Said body section is preferably formed from polymeric or plastics material. Said burner head is preferably metallic.

A further aspect of the invention provide a burner device comprising: an air intake; a burner head including an ignition device; a body section defining a fluid flow channel between said air intake and said burner head; and a gas injector for injecting combustible gas into said fluid flow channel, wherein said body section is separably formed from said burner head.

Another aspect of the invention provides a water heating apparatus comprising: a water tank having a cold water inlet and a heated water outlet; a thermostatic mixing valve having a cold water inlet, a heated water inlet, a cold water outlet, a mixed water outlet and a mixing chamber, the thermostatic mixing valve being configured to mix cold water received from said cold water inlet with heated water received from said heated water inlet to produce mixed water for dispensing through said mixed water outlet, wherein the mixing valve cold water inlet is capable of liquid communication with the mixing valve cold water outlet to allow cold water entering said mixing valve by said cold water inlet to leave said mixing valve by said cold water outlet, and wherein the heated water inlet of said mixing valve is connected to the heated water outlet of the water tank, and the cold water outlet of the mixing valve is connected to the cold water inlet of the water tank.

Preferably, the cold water outlet of said thermostatic mixing valve is connected to a drain valve. Typically said drain valve comprises a pressure relief valve. Said drain valve may be manually operable. Said thermostatic mixing valve and said drain valve may be provided on a common valve assembly. Said valve assembly may be removably fitted to said water tank as a unit.

The mixing valve cold water inlet may be in permanent liquid communication with the mixing valve cold water outlet. Alternatively, the mixing valve cold water inlet may be in selective liquid communication with the mixing valve cold water outlet by means of a valve.

A further aspect of the invention provides a water heating apparatus comprising: a water tank having a cold water inlet and a heated water outlet; and a drain valve operable to open and close a drain outlet, wherein the cold water inlet is connected to said drain valve. Preferably said drain valve comprises a pressure relief valve. Typically said drain valve is manually operable. Said cold water inlet and said drain valve are normally located at the in use bottom of the tank. Preferably the tank is located in a housing and an inlet conduit is connected to said cold water inlet and to the inlet of said drain valve, said conduit extending upwardly from said cold water inlet out of said housing. Optionally a mechanical operating mechanism is coupled to said drain valve for the operation thereof, said operating mechanism including a user-operable part that is exposed by said housing. Said mechanical operating mechanism may include a shaft extending between said drain valve and said user-operable part.

Optionally, said drain valve and, when present, said inlet conduit and said operating mechanism are provided on a common valve assembly. Said valve assembly may be removably fitted to said water tank as a unit.

A further aspect of the invention provides a heating apparatus comprising: a tank; a tank housing which houses said tank, said housing being shaped and dimensioned to define a head space at a face, preferably an end face, of said tank; and a burner device for heating fluid in the water tank, said burner device comprising a burner head including an ignition device; a body section defining a fluid flow channel; and a gas injector for injecting combustible gas into said fluid flow channel, wherein at least said body section is located in said head space.

Said burner device may include a fan located in said head space, and said housing includes an air intake, wherein the relative positioning of said air intake and said fan is such that, said fan acts, in use, to draw air through said air intake from outside of said housing, through said head space.

The heating apparatus may include a valve assembly including at least one valve for controlling the flow of water to and from said heating apparatus, wherein said valve assembly is located in said head section.

The heating apparatus may include a controller for controlling the operation of said heating apparatus, wherein said controller is located in said head section.

A still further aspect of the invention provides a structure, preferably a vehicle or a portable building structure, having a floor and a heating apparatus located under the floor, the heating apparatus comprising a tank, wherein insulating material is provided around at least the sides and preferably one or both ends of the tank, but not at the top of the tank and optionally not at the bottom of the tank. This arrangement reduces the depth of the heating apparatus, which facilitates the underfloor mounting. The tank is typically located inside a housing. The preferred housing has a top portion that is contiguous with the top of the tank and optionally to have a bottom portion that is contiguous with the bottom of the tank. Advantageously, said housing has one or more mounting devices for mounting a top portion of said housing to a surface. The housing may be shaped and dimensioned to provide space between at least the sides of the tank, and preferably one or both ends of the tank, for receiving insulating material.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example with reference to the accompanying drawings in which like numerals are used to denote like parts and in which.

DETAILED DESCRIPTION

Figure 1:
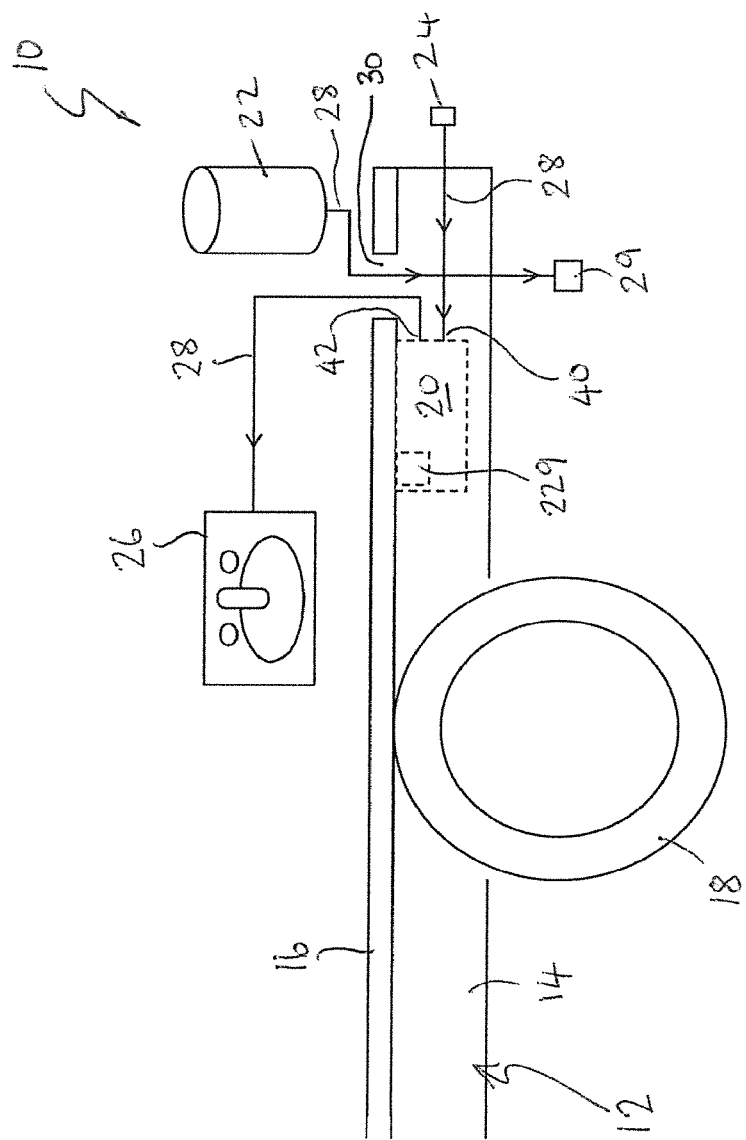
FIG. 1 is a schematic view of a vehicle having a water supply system that includes a heating apparatus embodying one aspect of the present invention.

Referring now to FIG. 1 of the drawings, there is shown, generally indicated as 10, a water supply system installed in a vehicle 12. Only parts of the vehicle 12 that are useful to gain an understanding of the embodiment are shown, in particular a chassis 14 supporting a floor 16, and a wheel 18. The vehicle 12 may for example be a caravan, recreational vehicle (RV), train or boat. In alternative embodiments (not illustrated) the water supply system 10 may be installed in a structure other than a vehicle, for example a mobile home or portable building.

The water supply system 10 includes a heating apparatus 20 embodying one aspect of the invention which, in typical applications, is located underneath the floor 16 of the vehicle 12 or other structure, or in a restricted space defined by the structure. The heating apparatus 20 may be mounted on or otherwise carried by the chassis 14, or other floor supporting structure, in any convenient manner. In the illustrated embodiment, the heating apparatus 20 is a water heating apparatus and has an inlet 40 for cold water and an outlet 42 for heated water. In alternative embodiments (not illustrated) the heating apparatus may be used, adapted as necessary, to heat other media, e.g. air. In such cases, the heating apparatus may be described as a space heater, and may be used in a vehicle or portable structure as described above, typically with one or more outlet ducts being provided for delivering heated air to one or more locations, e.g. a cabin, and one or more inlet duct for receiving air to be heated.

The water supply system 10 further includes one or more water sources, which in FIG. 1 comprises a water tank 22. Alternatively, or in addition, the system 10 may be connectable to an external water source (e.g. a tap stand or external tank—not shown) via a connector 24. The water supply system 10 further includes one or more dispensing outlets, which in FIG. 1 are represented by a sink and tap assembly 26, but which may include for example one or more taps, showers, spray heads or other outlets such as those for supplying water to machines (e.g. washing machines or dishwashers). Typically, the water supply system also includes a drain outlet 29, typically associated with a pressure relief valve and/or a manually operable valve, or a combined pressure relief/manually operable valve. The components of the system 10 are interconnected as appropriate by a network of liquid conduits 28, typically pipes and/or hoses, to allow water to flow between the components as appropriate. One or more apertures 30 may be provided in the floor 16 to facilitate passage of the conduits 28.

Figure 2:
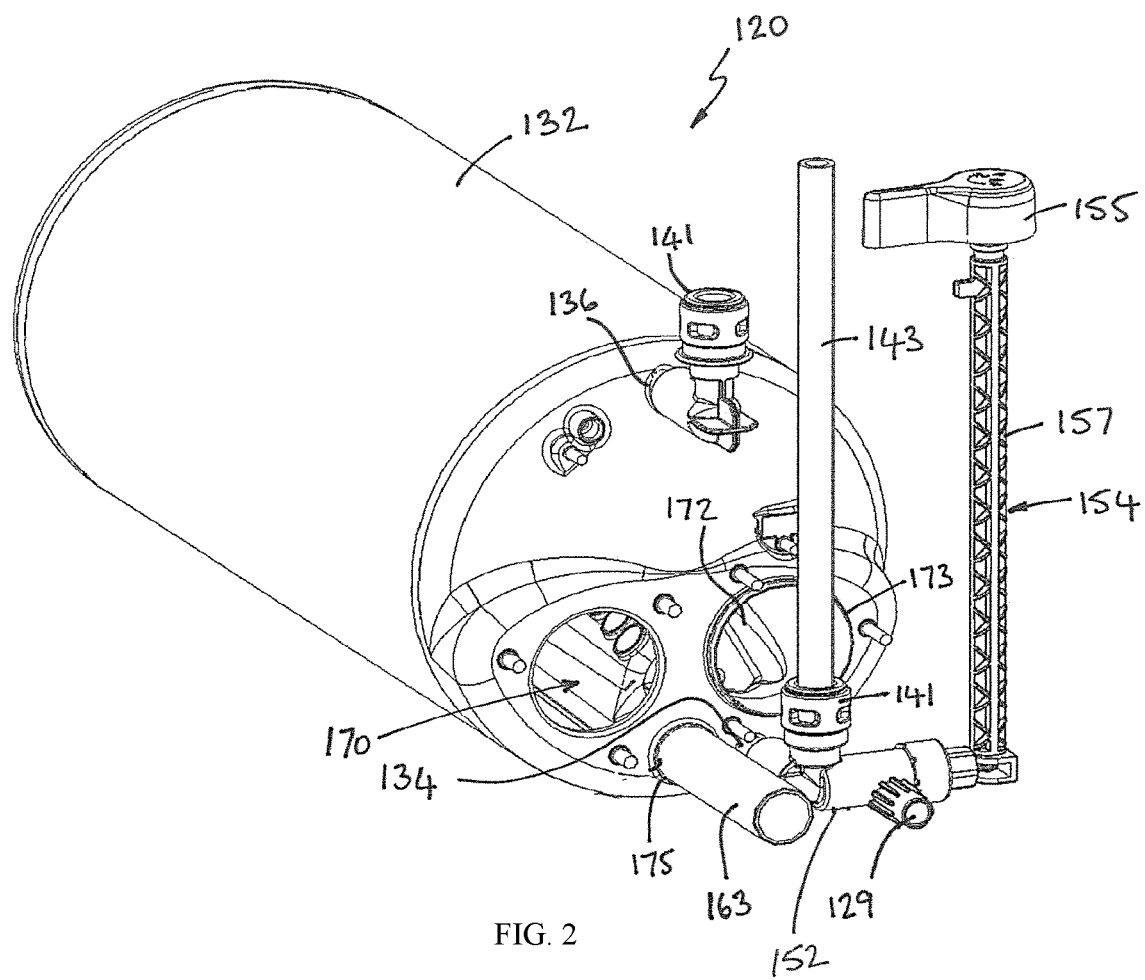
FIG. 2 is a perspective view of a heating apparatus embodying one aspect of the present invention, shown without a housing.
Figure 3A:
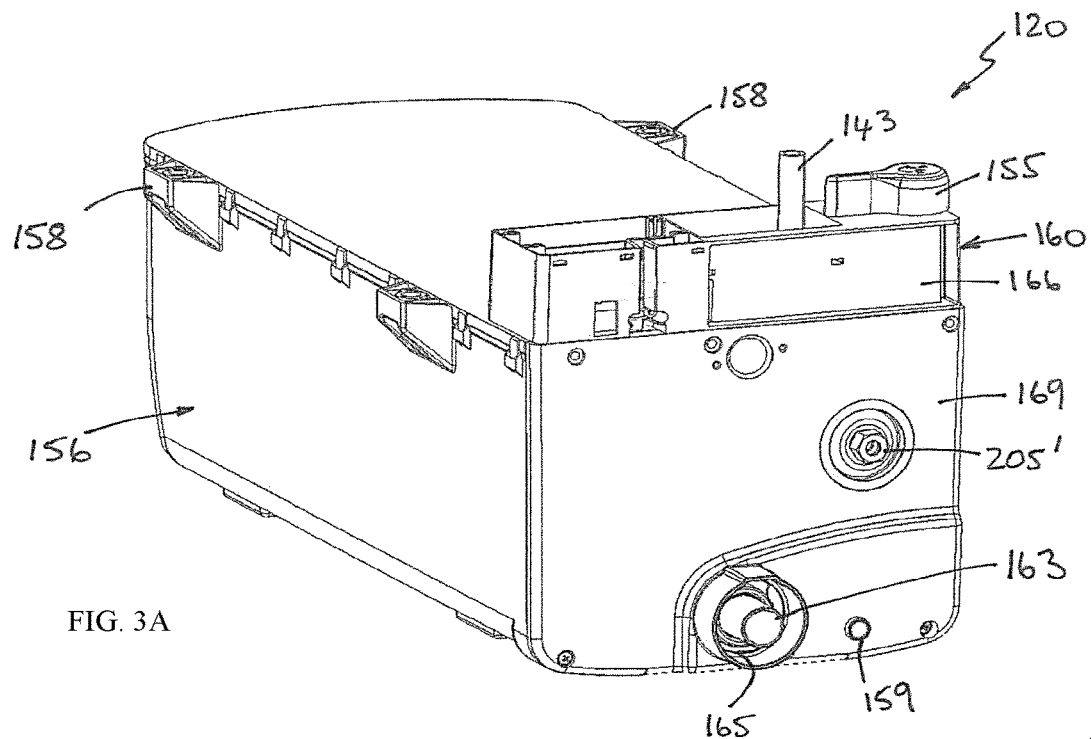
FIG. 3A is a perspective view of the heating apparatus of FIG. 2 shown in a housing.
Figure 3B:
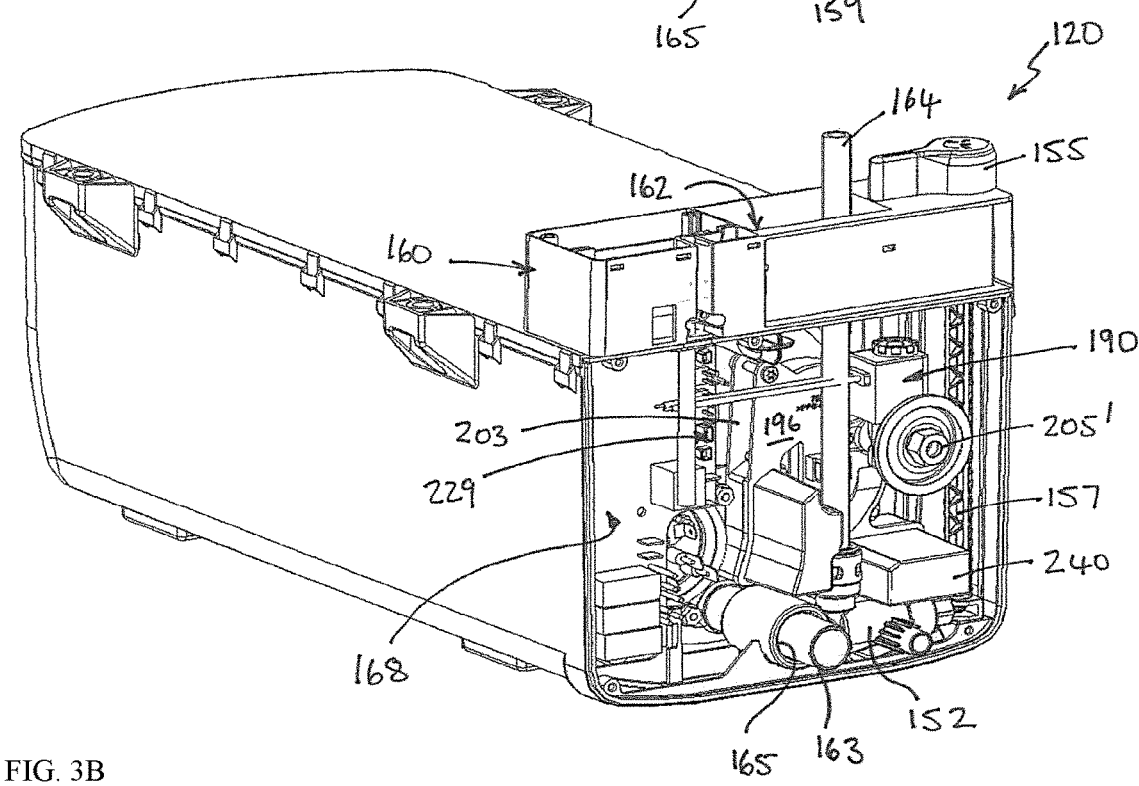
FIG. 3B is a perspective view of the heating apparatus of FIG. 2 shown in a housing with a cover removed to expose a headspace.

Referring now to FIGS. 2, 3A and 3B of the drawings there is shown, generally indicated as 120, a preferred embodiment of the heating apparatus, which is a water heating apparatus although it will be understood that the embodiment described herein may readily be adapted for use as a space heater as would be apparent to a skilled person. The water heating apparatus 120 comprises a heating tank 132 in which water is heated during use. The tank 132 has an inlet 134 for cold water and an outlet 136 for heated water, preferably formed in the same face, conveniently an end, of the tank 132. Typically, the inlet 134 is located at the in use bottom of the tank 132 and the outlet 136 is located at the in use top of the tank 132.

The inlet 134 and outlet 136 may be provided with any convenient conduit connector 141 to facilitate their connection to a conduit, typically a pipe or hose. In the preferred embodiment, a conduit 143, preferably in the form of a pipe, is connected to the inlet 134 and extends upwardly (in use) to an interface unit 160 to facilitate connection of the cold water inlet 134 to an external source of cold water. Typically, the connection between the pipe 143 and the tank inlet 134 is normally (e.g. permanently) open. Alternatively, it may be provided with a valve (not shown) operable, e.g. manually, to selectively allow, prevent or restrict the flow of water into the tank 132.

When the water heating apparatus 120 is connected to water supply system 10, the cold inlet 134 is connected to a source of cold water, for example water tank 22 or an external water supply via connector 24 (FIG. 1). The heated water outlet 136 is connected to one or more dispensing outlet such as sink 26. The water supply system 10 may be provided with one or more pumps (not shown) for pumping water through the system 10. By way of example, with reference to FIG. 1, a pump may be incorporated into any part of the network of conduits, as is convenient.

In preferred embodiments, conduit 143 is selectably connectable to a drain outlet 129 so that water entering the heating apparatus 120 via conduit 143 can be drained from the apparatus 120 through the drain outlet 129. Typically, a drainage valve 152 is provided for opening and closing the drain outlet 129. In the illustrated embodiment, the drain outlet 129 is an outlet of the valve 152, conduit 143 being connected to an inlet of the valve 152. The tank inlet 134 may also be connected to the inlet of the valve 152, i.e. directly or via the conduit 143. The drainage valve 152 may take the form of a pressure relief valve that is responsive to water pressure above a threshold value to open to allow water to drain though the drain outlet 129 from the conduit 143. Hence, in use, excess water pressure in the system 10 may cause the drainage valve 152 to open to relieve the pressure. Preferably, the valve 152 is configured to close once the excess pressure is relieved. Alternatively, or in addition, the drainage valve is manually operable. In the illustrated embodiment, a manual operating mechanism 154 is provided for operating the drain valve 152 between its open and closed states. This allows a user to manually drain the water system 10. In any event, when the drain valve 152 is closed, water entering the apparatus 120 via conduit 143 is fed to the heating tank 132 via inlet 134. In cases where no valve is provided between the inlet 134 and conduit 143 or drainage valve 152, the water in the tank 132 will drain via the drainage valve 152 when open. Optionally, a valve is provided between the inlet 134 and conduit 143 or drainage valve 152, which may be closed (manually or automatically) when the drainage valve 152 is open to prevent the water in the tank 132 from draining.

Advantageously, the conduit 143, drain valve 152 (including the drain outlet 129) and some or all of their associated components such as conduit connectors 141 and/or the operating mechanism 154 are provided as a valve assembly, some or all of which, as convenient, can be pre-assembled before installation on the tank 132. Some or all of the valve assembly may be removed from the tank 132, as required, to facilitate maintenance.

Figure 4A:
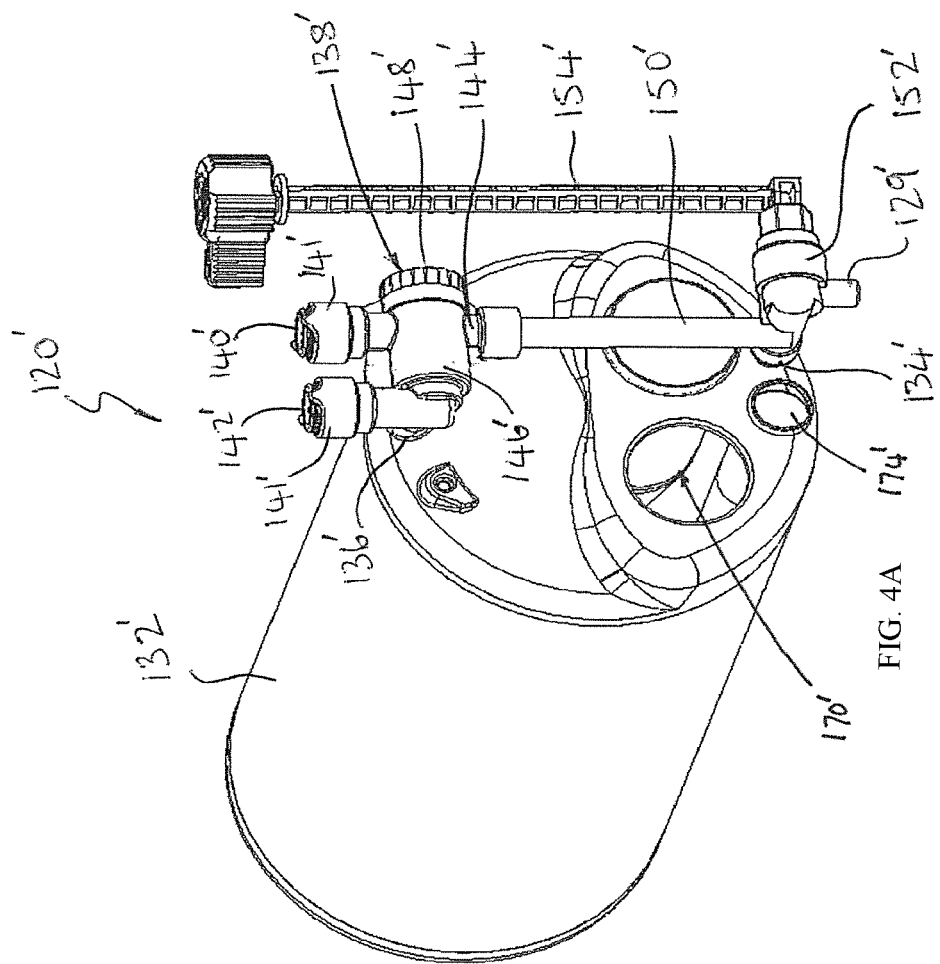
FIG. 4A is a perspective view of an alternative heating apparatus embodying the invention, the apparatus including a thermostatic mixing valve and being shown without its housing.
Figure 4B:
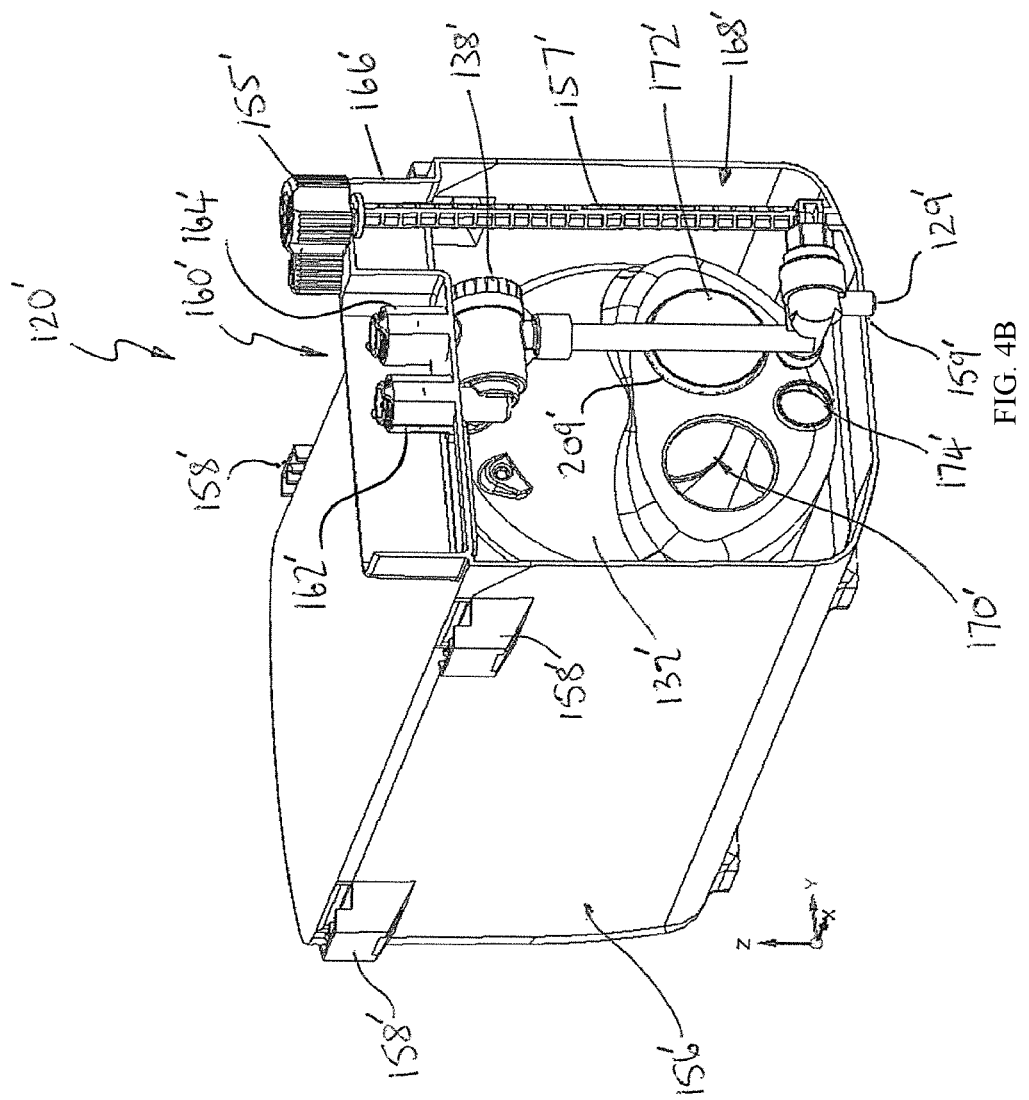
FIG. 4B is a perspective view of the heating apparatus of FIG. 4A shown inside its housing.
Figure 5:
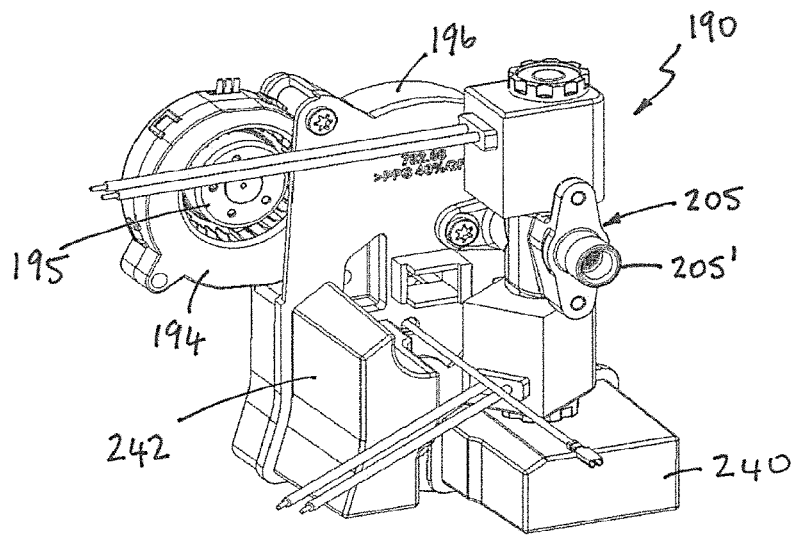
FIG. 5 is a perspective view of a burner embodying another aspect of the invention and included in preferred embodiments of the heating apparatus.
Figure 6:
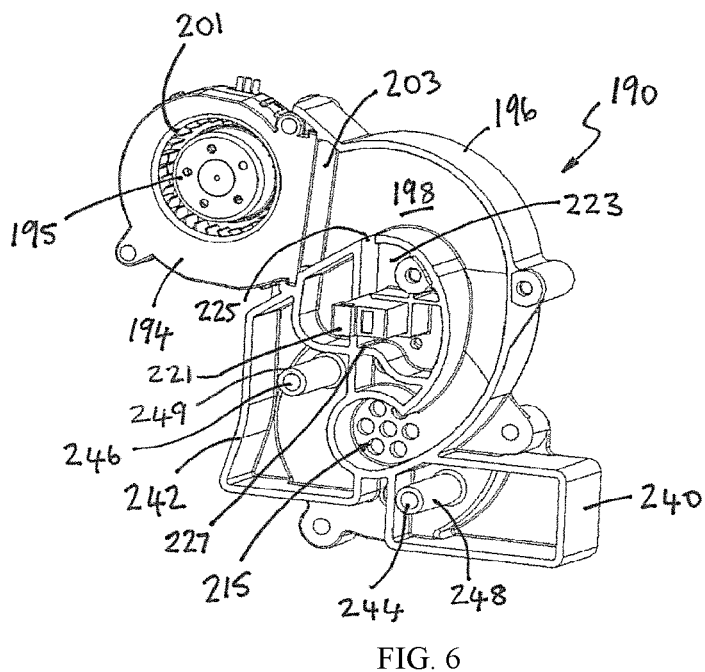
FIG. 6 is an alternative perspective view of the burner of FIG. 5 with parts removed to expose internal features of the burner.

Referring now to FIGS. 4A and 4B, an alternative embodiment of the water heating apparatus is shown, generally indicated as 120', which is similar to the heating apparatus 120 and in respect of which like numerals are used to denote like parts and similar descriptions apply as would be apparent to a skilled person. The heating apparatus 120' includes a thermostatic mixing valve 138' which has a hot water inlet (not visible) connected to the outlet 136' of the tank. The valve 138' has a cold water inlet 140' and a mixed water outlet 142'. Advantageously, a cold water outlet 144' is also provided. The valve 138' includes a mixing chamber 146' in which heated water from the tank 132' can be mixed with cold water from the valve inlet 140' before being dispensed via the mixed outlet 142'. The inlets and outlets of the thermostatic valve 138' may be provided with any convenient conduit connector 141' to facilitate their connection to a conduit 28 (FIG. 1), typically a pipe or hose.

A thermostat device (not visible) is provided in the mixing chamber 146' for controlling mixing of cold and heated water supplied to the chamber 146' in use via the cold water inlet 140' and hot water inlet respectively. The thermostat device is responsive to the temperature and/or pressure of the water in the chamber 146' (and/or elsewhere, e.g. elsewhere in the valve 138') to adjust the relative quantities of heated and cold water in the mixed water in order to maintain the mixed water exiting in use via outlet 142' at a set temperature. The valve 138' may have a manually operable control 148' for controlling the set temperature. The thermostat device may operate by controlling the respective quantities of cold and heated water entering the chamber 146' via the cold inlet 140' and hot inlet respectively, e.g. by controlling the respective flow rates and/or pressures. The thermostat device may take any convenient conventional form. For example it may comprise one or more valves operable in response to changes in temperature to control the quantity of water entering the chamber 146' via any one or both of the cold water inlet 140' and hot water inlet as appropriate, e.g. by adjusting the size of the, or the respective, opening by which any one or both of the cold and heated water enters the chamber 146'. In preferred embodiments, a valve (not visible) is provided between the cold water inlet 140' and the mixing chamber 146' and is operable by the thermostat device to control the quantity of cold water entering the chamber 146'. Conveniently, the hot water inlet to the thermostatic valve 138' may open into the mixing chamber 146' without the presence of a valve to control its flow. Optionally, a valve (not shown) may be provided between the mixing chamber 146' and the mixed outlet 142' for controlling the flow of water out of the apparatus 120'.

The cold water outlet 144' of the thermostatic valve 138' is provided to allow water to pass through the valve 138' from the cold inlet 140'. The thermostatic valve 138' may be configured internally in any convenient manner to facilitate this. In the preferred embodiment, the cold water outlet 144' is in liquid communication with the inlet 140' such that water entering the valve 138' by the inlet 140' may exit the valve 138' via the cold water outlet 144'. In the preferred embodiment, the proportion of water exiting the thermostatic valve 138' via outlet 144' having entered via inlet 140' depends on the setting of the valve that controls the flow of water into the mixing chamber 146' from the inlet 140'. Conveniently, the cold water outlet 144' may be normally (e.g. permanently) open. Alternatively, it may be provided with a valve (not shown) operable, e.g. manually, to selectively open or close the outlet 144'.

In preferred embodiments, the cold water outlet 144' is connected to the cold water inlet 134' of the heating tank 132' so that at least some of the cold water entering the heating apparatus 120' via cold water inlet 140' is supplied to the tank 132' for heating. Conveniently, the connection between the cold water outlet 144' and the tank inlet 134' may be normally (e.g. permanently) open. Alternatively, it may be provided with a valve (not shown) operable, e.g. manually, to selectively allow, prevent or restrict the flow of water into the tank 132'.

In preferred embodiments, the hot water outlet 136' is located at the in use top of the tank 132', and the cold water inlet 134' is located at the in use bottom of the tank 132'. The thermostatic valve 138' is preferably located adjacent the hot water outlet 136' and so a conduit 150' is provided to connect the valve outlet 144' to the tank inlet 132'.

When the water heating apparatus 120' is connected to water supply system 10, the cold inlet 140' is connected to a source of cold water, for example water tank 22 or an external water supply via connector 24. The mixed water outlet 142' is connected to one or more dispensing outlet such as sink 26. At least some of the water entering the heating apparatus 120' via inlet 140' is supplied to the tank 132' via inlet 134', while some of it may be directed into the mixing chamber 146'. Heated water exits the tank 132' via outlet 136', enters the mixing chamber 146' where, depending on the setting of the thermostatic valve 138', it is mixed with cold water before being dispensed from the apparatus 120' via outlet 142'. The water supply system 10 may be provided with one or more pump (not shown) for pumping water through the system 10. By way of example, with reference to FIG. 1, a pump may be incorporated into any part of the network of conduits, as is convenient.

Advantageously, the outlet 144' of the thermostatic valve 138' is connected to the drain outlet 129' so that water entering the heating apparatus 120' via cold water inlet 140' can be drained from the apparatus 120' through the drain outlet 129' via the thermostatic valve 138'. Typically, a drainage valve 152' is provided for opening and closing the drain outlet 129' (the drain outlet 129' conveniently being an outlet of the valve 152'). The drainage valve 152' may comprise a pressure relief valve that is responsive to water pressure above a threshold value to open to allow water to drain though the drain outlet 129'. Hence, in use, excess water pressure in the system 10 may cause the drainage valve 152' to open to relieve the pressure. Preferably, the valve 152' is configured to close once the excess pressure is relieved. Alternatively, or in addition, the drainage valve is manually operable. In the illustrated embodiment, a manual operating mechanism 154' is provided for operating the drain valve 152' between its open and closed states. This allows a user to manually drain the water system 10. In any event, when the drain valve 152' is closed, water leaving the thermostatic valve 138' via outlet 144' is fed to the heating tank 132'. In cases where no valve is provided between the inlet 134' and conduit 150' or drainage valve 152', the water in the tank 132' will drain via the drainage valve 152' when open. Optionally, a valve is provided between the inlet 134' and conduit 150' or drainage valve 152', which may be closed (manually or automatically) when the drainage valve 152' is open to prevent the water in the tank 132' from draining.

Advantageously, the thermostatic valve 138', the drain valve 152' (including the drain outlet 129') and some or all of their associated components such as the conduit 150', conduit connectors 141' and/or the operating mechanism 154' are provided as a valve assembly, some or all of which, as convenient, can be pre-assembled before installation on the tank 132'. Some or all of the valve assembly may be removed from the tank 132', as required, to facilitate maintenance. Moreover, the integration of the drain valve 152' and drain outlet 129' with the mixing valve allows the valve assembly to be more compact than if provided separately.

An advantage of providing the thermostatic mixing valve 138' on the tank 132' is that the water in the tank 132' can be heated to higher temperatures (e.g. approximately 90° or more) than would otherwise be safe, since it is mixed with cold water before being dispensed. For a given output capacity and temperature, this allows the tank 132' to be relatively small in comparison with a water tank that has internal temperature control since a smaller volume of heated water is required to achieve the same dispensed volume.

In FIGS. 3A, 3B and 4B, the heating tank 132, 132' is shown inside a housing 156, 156'. The housing 156, 156' has a plurality of mounting fixtures 158, 158', for example for receiving a screw or other fixing, by which the heating apparatus 120, 120' may be mounted to the chassis 14 and/or floor 16, or other structure depending on the application. The housing 156, 156' has an interface unit 160, 160' that may include a respective port 162, 162',164,164' for the water outlet and cold water inlet. The ports may be shaped and dimensioned to receive the respective connectors 141, 141', and/or conduit 143. Alternatively, the ports themselves may be configured to serve as connectors for external conduits. Advantageously, the arrangement is such that the ports are side-by-side for ease of connection to the water supply system 10. The interface unit 160, 160' may also include a portion 166, 166' for receiving the operating mechanism 154, 154'. Preferably, the arrangement is such that the user-operable part 155, 155' of the mechanism is exposed by the interface unit 160, 160', preferably adjacent the ports 162, 162', 164, 164'. In the illustrated embodiments, the operating mechanism includes a shaft 157, 157' extending between the user-operable part 155, 155' and the drain valve 152, 152', the shaft 157, 157' being located in the housing 156, 156'. The housing 156, 156' is shaped to define an opening 159, 159' for exposing the drain outlet 129, 129'.

Advantageously, the housing 156, 156' is shaped and dimensioned to define a head space 168, 168' at an end of the tank 132, 132, in particular the end that includes the hot and cold water inlets 134, 134', 136, 136'. The head space 168, 168' is enclosed by the housing 156, 156' during use (FIG. 3A), rather than being open as shown in FIGS. 3B and 4B.

Preferably, a removable cover 169 is provided to enclose, or allow access to, the head space 168, 168', for example comprising a removable end panel. Advantageously, the cover 169, and/or one or more other parts of the housing 156, 156', includes one or more air intake 165 to allow air to be drawn into the housing 156, 156' during use, as is described in more detail hereinafter. The valve assembly, including the thermostatic valve 146' and the drain valve 152' as applicable are, when fitted to then tank 132, 132', located in the head space 168, 168'.

In preferred embodiments, the housing 156, 156' is shaped and dimensioned to allow thermally insulating material (not shown) to be located around the tank 132, 132', between the tank and the housing 156, 156'. In some embodiments, the insulating material may surround the body of the tank and cover the end opposite the headspace 168, 168'. Insulating material may also be provided to cover the end of the tank 132, 132' at the head space 168, 168' insofar as this is possible. In a particularly preferred embodiment, no insulating material is provided at the top (as viewed) of the tank 132, 132', the top preferably touching the internal surface of the top of the housing 156, 156'. Optionally, no insulating material is provided at the in use bottom of the tank 132, 132', and so the housing may be contiguous with, i.e. touching, the bottom of the tank. For example insulating material may be provided at sides and/or ends of the tank 132, 132' but not at the top and/or bottom. In such embodiments, the heating apparatus 120, 120' may be mounted to the underside of the vehicle 12 (or other structure) floor such that the top of the housing 156, 156' is in contact with the underside of the floor. As such, the floor (which typically includes or is otherwise provided with thermal insulation, or is itself thermally insulating itself) provides thermal insulation to the top of the tank 132, 132'. Not only does this save on insulation costs, but for a given height of tank 132, 132' it also reduces the overall height of the heating apparatus 120, 120', making it more suitable for fitting in confined spaces.

A heat exchanger 170, 170' is located inside the tank 132, 132'. The heat exchanger 170, 170' has a hollow body 176, 176' shaped to define a mouth 172, 172' and a flue outlet 174, 174' coupled to respective apertures 173, 173', 175, 175' provided in the tank 132, 132'. Preferably, the apertures 173, 173', 175, 175' are located in the same face of the tank 132, 132', conveniently at the end of the tank corresponding to the headspace 168, 168', i.e. in the same face that includes the hot water outlet 136, 136' and cold water inlet 134, 134'. A portion 181, 181' of the heat exchanger 170, 170' adjacent the mouth 172, 172' is shaped and dimensioned to receive a burner head 192, being part of a burner device 190 which is described hereinafter with reference to FIGS. 5 to 8. The heat exchanger 170, 170' is shaped and dimensioned to be immersed, in use, in the water located in the tank 132, 132'. The body 176, 176' is configured to define at least one internal fluid path between the mouth 172, 172' and a flue outlet 174, 174' to allow heated fluid to flow in a direction from the mouth 172, 172' to the outlet 174, 174'. In the preferred embodiment, the flue outlet 174 is connected to a flue pipe 163 that passes through the aperture 175 in the tank 132.

Typically, the heated fluid comprises primarily air, although other fluids, especially gases may alternatively be used. In any event, combustion products such as $CO_2$, water vapour and impurities are usually also present in the heated fluid. In use, the fluid in the heat exchanger is heated by the burner head 192. The heated fluid travels through the body 176, 176' and out of the flue outlet 174, 174'. The body 176, 176' is formed from one or more materials with a relatively high thermal conductivity, typically metal, that allow heat from the heated fluid to be transferred relatively efficiently through the body 176, 176' into the surrounding water in the tank 132, 132'. Hence the water in the tank 132, 132' is heated, the heated water exiting the tank 132, 132' via hot water outlet 136, 136'.

In the embodiment of FIGS. 4A and 4B, the body 176' comprises a pipe that is shaped to define at least one, but preferably only one, loop between the mouth 172' and the outlet 174'. Optionally, some or all of the body 176' may be corrugated (not illustrated) to increase its surface area.

Figure 9A:
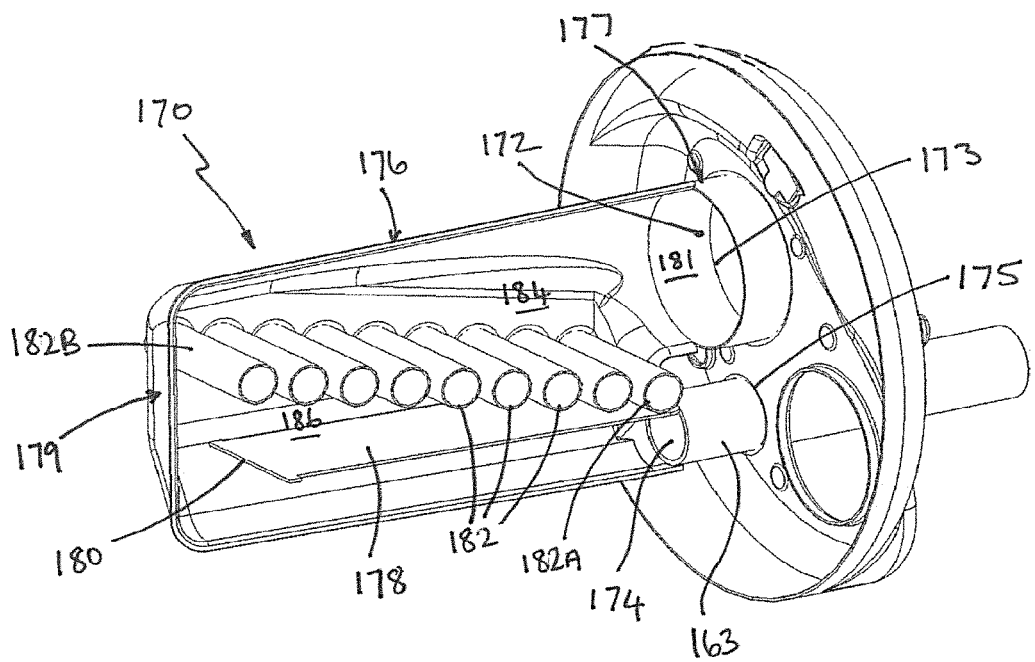
FIG. 9A is a perspective cut-away view of a heat exchanger suitable for use with heating apparatus embodying the present invention, shown fitted to the end of a tank.
Figure 9B:
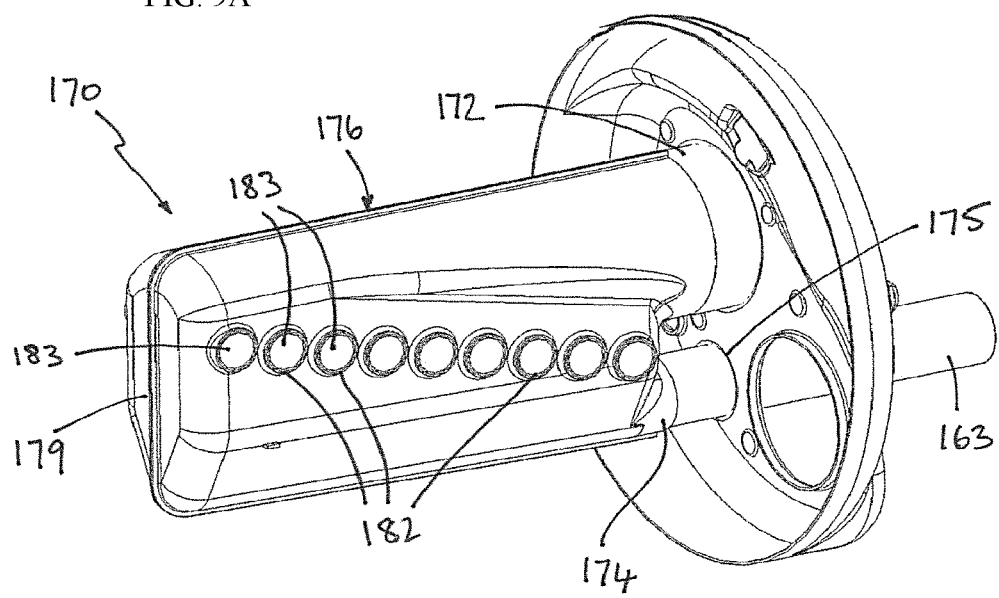
FIG. 9B is a perspective view of the heat exchanger of FIG. 9A.

FIGS. 9A and 9B show the preferred heat exchanger 170, which is incorporated into the tank 132 of the heating apparatus 120 of FIGS. 3A and 3B. The body 176 is configured to define a substantially U-shaped internal fluid path between the mouth 172 and the flue outlet 174, which are located at the same end 177 of the body. This may be achieved by providing a baffle 178 or other structure(s) in the body 176 to partition the internal body space between the mouth 172 and outlet 174 to define a fluid path that runs from the mouth 172 away from the end 177 towards the opposite end 179 of the body 176, around a free end 180 of the baffle 178 (or other structure(s)) and back to the outlet 174. The baffle 178 may for example comprise a plate that extends longitudinally of the body 176 having one end located at body end 177 separating the mouth 172 and outlet 174, and the other end located adjacent but spaced from the other body end 179. The baffle 178 is preferably dimensioned to match the transverse dimensions of the internal body space to prevent the fluid from flowing around the sides of the baffle 178. Preferably, the baffle 178 is disposed substantially along or parallel with the longitudinal axis of the body 176.

In the preferred embodiment, a plurality of pipes 182 extend transversely through the body 176 across the fluid path. The ends 183 of the pipes 182 are open to the interior of the tank 132 so that in use they may be filled by the contents of the tank 132, although the interior of the pipes 182 are not in fluid communication with the interior of the body 176. The pipes 182 are formed from a material with a relatively high thermal conductivity, preferably the same material as the body 176.

The pipes 182 are spaced-apart in the longitudinal direction, a first one 182A of the pipes 182 preferably being located adjacent the mouth 172 and a last one 182B preferably being located adjacent the body end 179. The pipes 182 are preferably also spaced-apart in a direction perpendicular with the longitudinal and transverse axes of the body 176 (i.e. the vertical direction as shown in FIGS. 9A and 9B). The preferred arrangement is such that, from the first pipe 182A to the last pipe 182B, the vertical spacing from one pipe 182 to the next is in the same vertical sense (e.g. upwards as shown in FIGS. 9A and 9B), and is preferably substantially uniform. As a result, the pipes 18 may lie substantially in a plane that is oblique to the longitudinal axis of the body 176. The pipes 182 are preferably provided only on one side of the baffle 178, most preferably the side of the mouth 172. In the preferred embodiment the first pipe 182A is located relatively close to the baffle 178, the next pipes 182 being progressively further from the baffle 178 until the last pipe 182B is furthest from the baffle 178. In an alternative embodiment (not illustrated) the opposite arrangement may be implemented, i.e. whereby the pipes 182 become progressively closer to the baffle 178 in a direction away from the mouth 172. In any case, the pipes 182 are arranged to leave sufficient space adjacent the mouth 172 to accommodate the burner head 192. Preferably, the first pipe 182A is located so as not to obstruct the mouth 172, e.g. located below the mouth 172 as viewed in FIG. 9A. As can best be seen from FIG. 9A, the pipes 182 define on one side (above the pipes as viewed in FIG. 9A) an internal body region 184 that is relatively wide (in the vertical direction) adjacent the mouth 172 and which tapers in a direction towards the end 179 of the body 176, and an internal body region 186 on the other side (below the pipes as viewed in FIG. 9A) that is relatively narrow (in the vertical direction) adjacent the mouth 172 and which widens in a direction towards the end 179 of the body 176. This improves the heating exchanging ability of the heat exchanger (since the pipes 182 provide additional heat exchanging surfaces between the body 176 and the contents of the tank 132) while allowing space for the burner head 192 and allowing the fluid to flow along the fluid path as desired.

Optionally, one or more additional baffles (not shown) may be located in the fluid path, for example beneath the baffle 178 as viewed in FIG. 9A, to reduce laminar fluid flow. Any such baffles may extend longitudinally of the body 176.

Preferably, the heat exchanger body 176 comprises first and second parts (the first part being shown in FIG. 9A, and both parts being shown in FIG. 9B) which are formed separately, e.g. by a conventional moulding or press-forming process, and then joined together by any suitable process, e.g. welding, the first and second parts being shaped to define together the desired body shape. Before the two parts are joined, the pipes 182 and baffle 178 may be installed.

Referring now to FIGS. 5 to 8, a preferred embodiment of the burner device 190 is described. The burner 190 comprises the burner head 192 and a fan housing 194 interconnected by a body section 196 which internally defines a channel 198 for fluid to flow from the fan housing 194 to the burner head 192. The fan housing 194 houses a fan 195, for example an impeller, which in use draws air into the burner 190 by an air intake 201 and directs it into the fluid flow channel 198 via outlet 203. A gas injector 205 is connected to the burner 190 and configured to inject combustible gas, for example comprising propane or any other combustible gas or mixture of combustible gases, into the channel 198, preferably at a location (indicated by way of example as L1 in FIG. 8) between the fan outlet 203 and the burner head 192. The gas injector 205 is connectable to a suitable source of combustible gas (not shown), which may comprise part of the system 10 or of the heating apparatus 20, 120, 120' or be external thereto. The gas injector 205 may be of any suitable conventional type.

The burner head 192 includes an ignition device 193, for example comprising one or more sparking electrodes or other electrical sparking device, for igniting a combustible gas and air mix that emanates in use from the channel 198 through the burner head 192. The preferred burner head 192 is shaped and dimensioned to fit into the body 176 of the heat exchanger 170 via the heat exchanger mouth 172. In the illustrated embodiment, the burner head 192 is generally circular in transverse cross section but may alternatively take other shapes. A mounting collar 207 may be provided around the head 192 for interconnection to a corresponding mounting structure (not shown) around the heat exchanger mouth 172 to mount the burner 190 on the tank 132.

Figure 7:
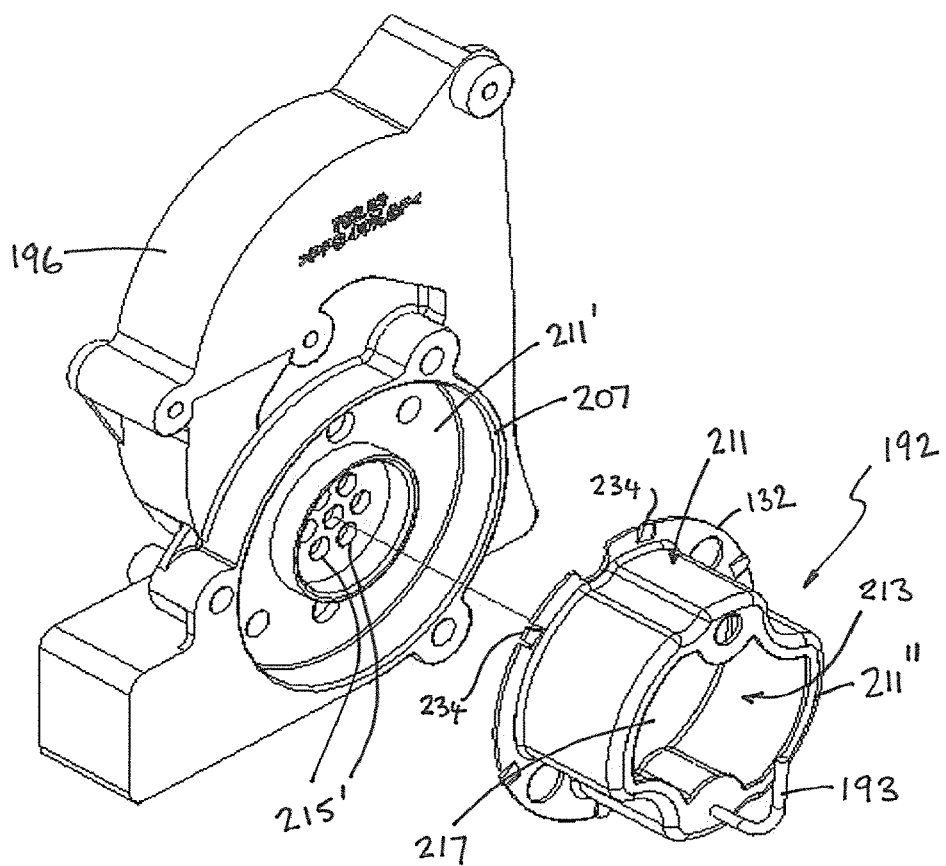
FIG. 7 is a perspective exploded view of the burner of FIG. 5.

In preferred embodiments, the burner head 192 includes a body 211 shaped to define a mixing chamber 213. The mixing chamber 213 has an inlet 215 by which a mixture of gas and air may be received from the channel 198, and an outlet 217 by which a mixture of gas and air is directed to the ignition device 193 for ignition. The inlet 215 preferably comprises a plurality of spaced apart apertures 215' formed in a wall 211' between the channel 198 and the mixing chamber 213. The apertures 215' may have a respective central axis that is perpendicular to the wall 211' (as illustrated), or in alternative embodiments may have a respective central axis that is oblique to the wall 211'. Typically, between 3 and 10 apertures are provided. Preferred embodiments have 7 or 8 apertures. Referring in particular to FIG. 7, the body 211 comprises the base wall 211' and a sleeve like side wall 211" (shown exploded), which together define the chamber 213.

The outlet 217 is preferably oppositely located with respect to the inlet 215 and may optionally be covered by one or more mesh layers (not shown). It is preferred however that a mesh structure is located between the inlet 215 and the outlet 217, covering at least the inlet 215 and preferably also covering an entire cross-section of the body 211. In the illustrated embodiment, the mesh structure comprises one or more layers of mesh material, which may form all or part of the end face of the chamber 213 opposite the outlet 217. For example, with reference in particular to FIG. 8, the mesh structure may comprise a first mesh layer 219 shaped and dimensioned to cover the inlet 215, and optionally a second mesh layer 219' shaped and dimensioned to cover the inner end of the side wall 211'. Advantageously, the or each mesh layer has sufficiently fine reticulations so as to have a mixing effect on the gas and air mixture passing through it during use. Optionally, the mesh structure may include a perforated or slotted plate 219", for example located between the mesh layer 219' and the burner head 192. The plate 219", sometimes referred to as a burner skin, provides a surface to which the flame is anchored during use. The gas/air mix passes through the perforations to form jets for burning. The size of the perforations and velocity of the jets is such that the flame does not travel back through the perforations. A gasket 230 may be provided between the side wall 211" and base wall 211' of the body 211. In the illustrated embodiment, the gasket 230 is located between the mesh layers. In the preferred embodiment, the side wall portion 211" of the body 211 is formed from metal, e.g. steel. It is preferred however that the main body of the burner 190, including the fan housing 194, the body section 196, base wall 211' and mounting collar 207, are formed from plastics or polymeric material to reduce conduction of heat away from the burner head 192. A flange 132 may be provided around the base of the side wall portion 211" for engagement with the base wall portion 211'. A plurality of flexible tabs 234 may be provided in the flange 132. The tabs 234 are configured to deform upon engagement of the side wall portion 211" with the mounting collar 207 to retain the side wall portion 211' on the collar 207. In the preferred embodiment, when the burner is fitted to the tank 132, the end of the heat exchanger 172' holds the components together.

In preferred embodiments, the transverse cross sectional area of the mixing chamber 213, i.e. the area in a plane perpendicular with the general direction in which the gas and air mix flows through the burner 190, is relatively large in comparison with the transverse cross sectional area of the channel 198. This allows a relatively large mixing chamber 213 to be provided and so to improve the mixing of the air with the combustion gas. Mixing of the air with the combustion gas is also improved by the multiple-aperture inlet 215 to the chamber 213, and by the mesh structure. The multi-aperture inlet 215 also has the effect of restricting the rate of fluid flow into the mixing chamber 213, which is advantageous since it allows a relatively powerful fan to be used.

In preferred embodiments, the burner head 192 is oriented such that its longitudinal axis, i.e. along the general direction of fluid flow from the inlet 215 to the outlet 217, is substantially perpendicular to the plane in which the channel 198 is defined and in which the gas/air mix flows along the channel 198. Advantageously, the fan housing 194 and body section 196 are mutually oriented to be substantially coplanar. To this end, in the illustrated embodiment, the rotational axis of the fan is substantially perpendicular with the plane in which the channel 198 is defined and in which the gas/air mix flows along the channel 198. These arrangements each contributes to allowing the burner 190 to be relatively compact, in particular such that the burner head 192 fits inside the heat exchanger 170 and the fan housing 194 and body section 196 may fit against or at least be disposed in a plane substantially parallel with the end face of the tank 132. Moreover, to further improve the compactness of the burner 190, it is preferred that the body section 196 is shaped such that the channel 198 is curved, conveniently substantially U-shaped, in the plane of fluid flow. Optionally, a baffle 199 is provided in the channel 198, preferably upstream of the gas injector 205, for creating turbulence in the air flow.

Preferably, an air flow detector 221 is provided for detecting whether or not air is flowing in the channel 198, and in particular for detecting if air is entering the channel from the fan outlet 203. To reduce the possibility that the operation of the detector 221 is affected by turbulence in the channel 198, it is preferred to locate the detector 221 in an air flow detection channel 223 which is subsidiary to but otherwise separate from the main channel 198. In preferred embodiments, the body section 196 is therefore shaped to define the air flow detection channel 223 having an inlet 225 located in the main channel 198 between the fan outlet 203 and the gas injector 205, and an outlet 227 located downstream of the inlet 225, preferably downstream of the gas injector 205 and conveniently at the end of the channel 198 adjacent the inlet 215 to the mixing chamber 213. In use, the air flow detector 221 generates an electrical signal that is indicative of the level of air flow in the flow detection channel 223 and therefore in the main channel 198.

Figure 8:
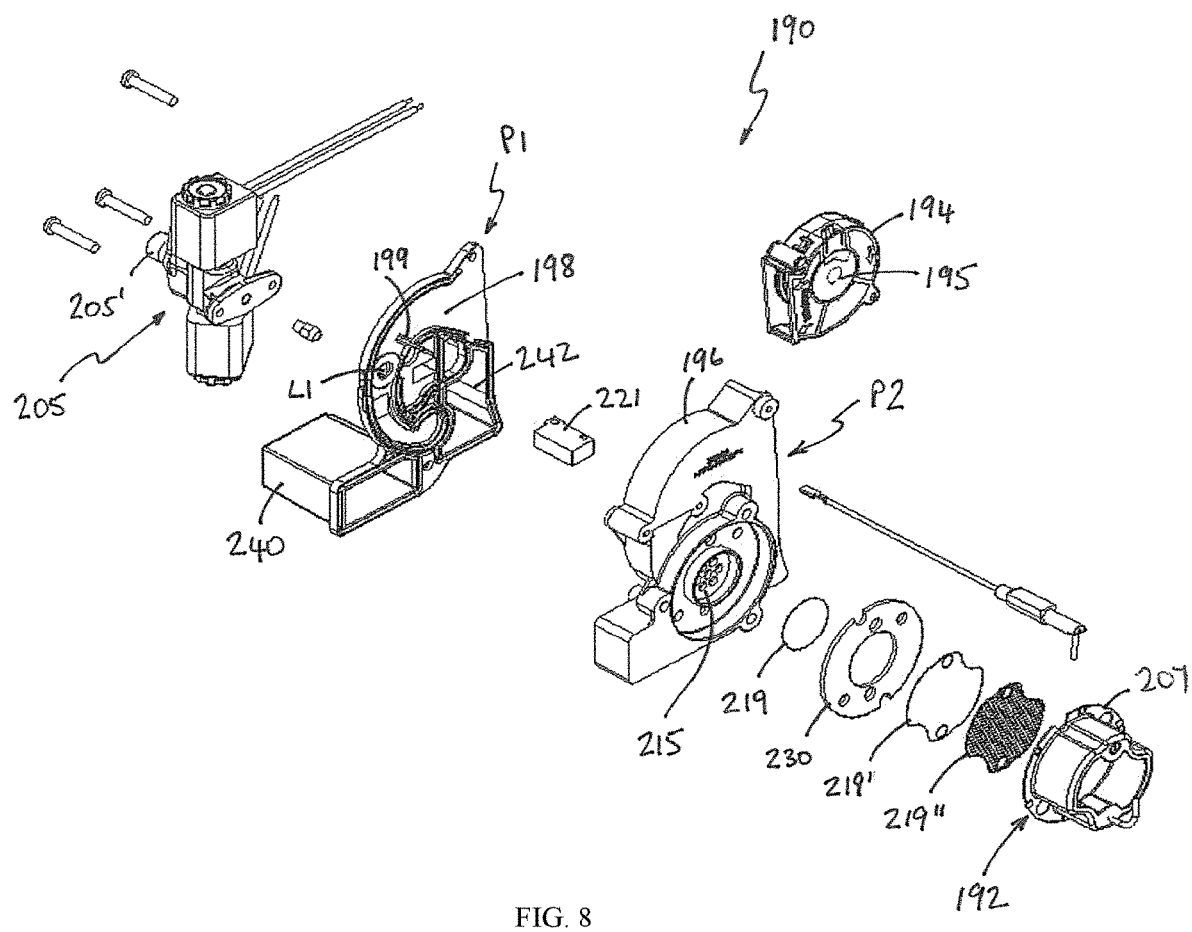
FIG. 8 is an alternative perspective exploded view of the burner of FIG. 5.

In preferred embodiments, the burner 190 includes at least one resonance chamber 240, 242 of a type sometimes known as a Helmholtz chamber or Helmholtz resonator. In the illustrated embodiment, the burner includes two resonance chambers 240, 242. Each resonance chamber 240, 242 is shaped and dimensioned such that the fluid (typically air) inside it resonates at a respective frequency corresponding to a resonant frequency of the apparatus 20, 120, 120'. In general, the apparatus 20, 120, 120' may have one or more resonant frequencies, i.e. frequencies at which fluid in the apparatus (typically air or a mixture of combustion gas(es) and air), especially the fluid in the burner 190 and/or the heat exchanger 170, resonates. The resonant frequencies of the apparatus 20, 120, 120' are determined by the size and shape of the relevant parts of the apparatus, e.g. the body section 196, combustion chamber 213 and the interior of the heat exchanger body 176. The illustrated apparatus 120 is found to exhibit two such resonant frequencies of significance and the chambers 240, 242 are configured to match a respective one of these frequencies. Each resonance chamber 240, 242 has a fluid inlet 244, 246 to allow fluid communication between the respective chamber 240, 242 and the fluid in the burner 190 and/or heat exchanger 170. Preferably, the inlets 244, 246 open into the mixing chamber 213. Optionally, the inlets 244, 246 are provided by a respective tube 248, 249 located in the respective chamber 240, 242. The resonance chambers 240, 242 act to reduce or eliminate the effects that fluid resonance may otherwise have in the burner 190 and/or heat exchanger 170, e.g. noise, vibration and/or reverberation. Referring in particular to FIG. 8, the main body of the burner 190, in particular comprising the body section 196 and as convenient the resonance chambers 240, 242, mounting collar 207 and base wall 211' and other associated features described herein, is preferably formed as two parts P1, P2, each preferably being moulded from plastics. The parts P1, P2 may be joined together in any convenient manner, e.g. ultrasonic welding.

The heating apparatus 20, 120, 120' includes a controller that is indicated schematically in FIG. 1 as 229. The controller 229 may take any suitable form but typically comprises a suitably programmed microprocessor, microcontroller or other programmable processor, usually with associated conventional electronic circuitry as would be apparent to a skilled person, some or all of which may be provided on a substrate such as a printed circuit board (PCB). The controller 229 is configured to control the operation of the burner 190, in particular the fan 195, the gas injector 205 and the ignition device 193. The controller 229 is typically configured to activate or deactivate the burner 190 in response to electrical signals from one or more other components of the system 10, for example a pump controller (not shown), or one or more activation switches (not shown) that are operated when one or more of the system's dispensing outlets are operated. Activation or deactivation of the fan 195 and the injector 205 may be substantially simultaneous or in any sequence, although it is preferred to activate the fan before the gas injector. Activation of the ignition device 193 may be substantially simultaneous with activation of the gas injector 205. However, it is optional to activate the ignition device 193 after the gas injector has been operated to inject gas into the channel 198, for example by approximately 50 ms or more. This tends to reduce the possibility of reverberation of the gas/air mix in the channel 198.

In preferred embodiments, the controller 229 is responsive to the signal generated by the air flow detector 221 to stop the injection of combustible gas into the channel 198 by the gas injector 205 depending on the level of detected air flow. In particular, the controller 229 may be configured to stop the gas injection upon detection of no air flow by the detector 221, or the detection of a level of air flow below a threshold level. Typically, the gas injector 205 has a valve controlled injector head 205', the operation of which may be controlled by the controller 229 to this end.

Referring again to FIG. 3B in particular, the burner 190, or at least part of it typically including the fan housing 192 and body section 196, when fitted to the tank 132 is advantageously located in the head space 168, conveniently between the valve assembly and the end of the tank 132. Part of the gas injector 205, typically at least the injector head 205', may also be located in the head space 168. Other part(s) of the gas injector 205, for example the connecting conduit (not shown) for connection to the gas source, may project out of the housing 156. The head space cover 169 may be provided with one or more apertures as appropriate to facilitate this. Advantageously, the controller 229, and any associated circuitry e.g. mounted on a circuit board, may also be located in the head space 168, for example mounted to or otherwise carried by an internal surface of the housing 156.

In preferred embodiments, the fan housing 194 is open to the head space 168 such that the fan, in use, draws air from the head space 168 into the burner 190. Advantageously, an air intake 165 is provided in the tank housing 156, preferably in the portion of the housing 156 that defines the head space 168, e.g. cover 169, to allow air to be drawn into the headspace 168 from outside of the apparatus 120. The air intake 165 may be positioned such that the fan draws air through the head space 168, preferably across the controller 229 in order to provide a cooling effect. In the preferred embodiment, the air intake 165 is annular and is located around the flue outlet 174. To this end, in the preferred embodiment the cover 169 is shaped to define aperture 167 through which flue pipe 163 projects, the arrangement being such that the annular intake 165 is defined around the pipe 163.

Optionally, the housing 156 includes a window (not shown) through which the head space may be viewed from outside. The controller 229 is advantageously positioned within the head space 168 such that it may be seen through the window. Preferably, the window is provided in the interface unit 160, for example in the form of a transparent connector panel by which electrical connection(s) can be made between the controller 229 and external electrical system(s). One or more visible status indicators (e.g. LEDS or other lamps) may be provided on the controller 229 and be visible through the window. This arrangement obviates the need to provide such indicators in the interface unit itself.

The invention is not limited to the embodiments described herein which may be modified or varied without departing from the scope of the invention.

What is claimed is:

1. A heating apparatus comprising:
a tank, the tank having a tank inlet, a tank outlet, a heat exchanger inlet and heat exchanger outlet;
a heat exchanger located in the tank, the heat exchanger comprising a hollow body having a mouth coupled to the heat exchanger inlet and a flue outlet coupled to the heat exchanger outlet, wherein the heat exchanger inlet and heat exchanger outlet are located in a common face of the tank; and
a burner device, the burner device having:
an air intake;
a burner head including an ignition device;
a gas injector; and
a burner body providing a fluid flow channel between said air intake and said burner head, wherein said gas injector is configured to inject combustible gas into said fluid flow channel such that said burner body supplies a mixture of combustible gas and air to the burner head in use,
and wherein said burner head has a burner head inlet for receiving said mixture of combustible gas and air from said burner body, and a burner head outlet for said mixture of combustible gas and air, wherein said burner head inlet is located at a first end of said burner head, and said burner head outlet is located at a second end of said burner head, said second end being opposite said first end such that said burner head inlet and said burner head outlet are oppositely disposed with respect to each other, and wherein a mixing chamber is provided between said burner head inlet and said burner head outlet, and wherein said ignition device is located downstream of said burner head outlet in order to ignite the mixture of combustible gas and air that emanates from said burner head outlet during use;
and wherein said burner body, including said fluid flow channel provided by said burner body, is located outside of said tank and is disposed substantially parallel with said face of the tank such that said fluid flow channel directs said mixture of combustible gas and air to said burner head inlet in a direction substantially parallel to said face of the tank, and said burner head, including said mixing chamber and said ignition device, is located in the mouth inside the hollow body.

2. A heating apparatus comprising:
a tank, the tank having a tank inlet, a tank outlet, a heat exchanger inlet and heat exchanger outlet;
a heat exchanger located in the tank, the heat exchanger comprising a hollow body having a mouth coupled to the heat exchanger inlet and a flue outlet coupled to the heat exchanger outlet; and
a burner device, the burner device having
an air intake,
a burner head including an ignition device,
a gas injector, and
a burner body providing a fluid flow channel between said air intake and said burner head,
wherein said gas injector is configured to inject combustible gas into said fluid flow channel such that said burner body supplies a mixture of combustible gas and air to the burner head in use,
wherein the burner head comprises a body shaped to define a mixing chamber, the mixing chamber having an inlet by which a mixture of combustible gas and air is received in use from the fluid flow channel, and an outlet by which said mixture of combustible gas and air is directed to the ignition device, said mixing chamber inlet being located at a first end of said mixing chamber, and said mixing chamber outlet being located at a second end of said mixing chamber, said second end being opposite said first end such that said mixing chamber inlet and said mixing chamber outlet are oppositely disposed with respect to each other,
wherein said mixing chamber inlet comprises a plurality of spaced apart apertures formed in a wall between the fluid flow channel and the mixing chamber, each of said spaced apart apertures opening into said mixing chamber,
and wherein said burner body is located outside of said tank, and said burner head, including said mixing chamber and ignition device, are located in said mouth inside said hollow body.

3. The heating apparatus of claim 1, wherein said hollow body is configured to define at least one substantially U-shaped internal fluid path between the mouth and the flue outlet.

4. The heating apparatus of claim 1, wherein at least one structure is provided in said hollow body to define a fluid path that runs from said mouth in a direction away from said mouth, around a free end of said at least one structure, and back to the flue outlet.

5. The heating apparatus of claim 1, wherein said ignition device is located outside of said burner head adjacent said second end.

6. The heating apparatus of claim 1, wherein a mesh structure comprising one or more layers of mesh material is provided between said burner head inlet and said burner head outlet.

7. The heating apparatus of claim 2, wherein said hollow body is configured to define at least one substantially U-shaped internal fluid path between the mouth and the flue outlet.

8. The heating apparatus of claim 2, wherein at least one structure is provided in said hollow body to define a fluid path that runs from said mouth in a direction away from said mouth, around a free end of said at least one structure, and back to the flue outlet.

9. The heating apparatus of claim 2, wherein said ignition device is located outside of said burner head adjacent said second end.

10. The heating apparatus of claim 2, wherein a mesh structure comprising one or more layers of mesh material is provided between said burner head inlet and said burner head outlet.

11. The heating apparatus of claim 2, wherein the heat exchanger inlet and heat exchanger outlet are located in a common face of the tank.

12. The heating apparatus of claim 1, wherein the burner head is oriented such that an axial direction through said first and second oppositely disposed ends of the burner head is substantially perpendicular to a plane in which said fluid flow channel is defined.

13. The heating apparatus of claim 2, wherein the burner head is oriented such that an axial direction through said first and second oppositely disposed ends of the mixing chamber is substantially perpendicular to a plane in which said fluid flow channel is defined.

\* \* \* \* \*